(No Model.)
T. W. LANIER.
SELF COOLER AND STRAINER FOR SIRUP AND SUGAR.
No. 335,706. Patented Feb. 9, 1886.
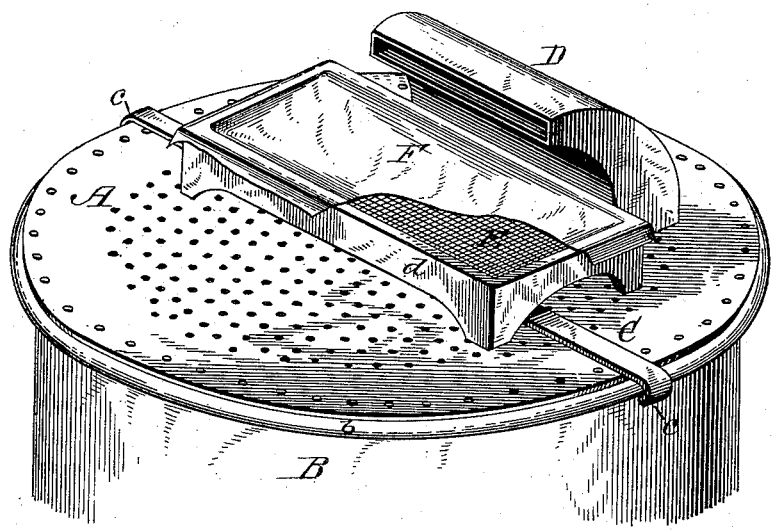
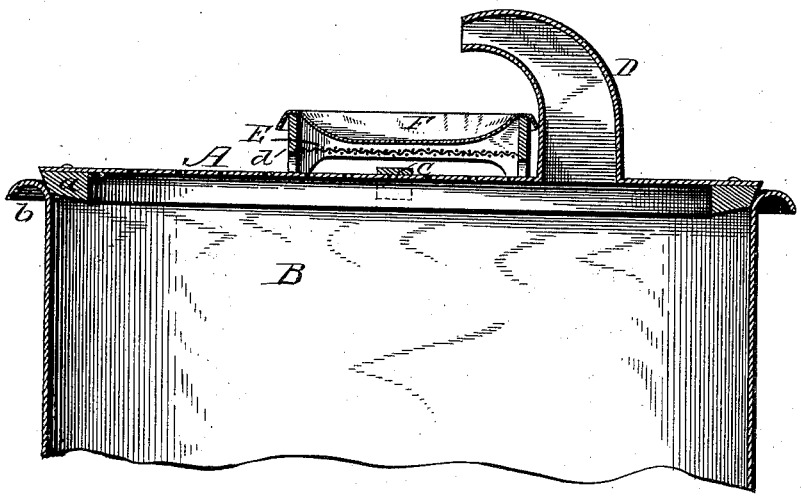
Witnesses
Inventor
Thomas W. Lanier,
By his Attorney ated February 9, 1886.

UNITED STATES PATENT OFFICE.

THOMAS WASHINGTON LANIER, OF GUYTON, GEORGIA.

SELF COOLER AND STRAINER FOR SIRUP AND SUGAR.

SPECIFICATION forming part of Letters Patent No. 335,706, dated February 9, 1886.

Application filed December 24, 1885. Serial No. 186,600. (No model.)

*To all whom it may concern:*

Be it known that I, THOMAS W. LANIER, a citizen of the United States, residing at Guyton, in the county of Effingham and State of Georgia, have invented certain new and useful Improvements in Sirup and Sugar Manufacturing; and I do hereby declare that the following is a full, clear, and exact description of the same, reference being had to the annexed drawings, making a part of this specification, and to the letters and figures of reference marked thereon.

Figure 1 of the drawings is a perspective view of my invention, and Fig. 2 a sectional view thereof.

The present invention has for its object to provide a simple and effective attachment to sugar-boilers, in which the sugar and sirup are both cooled and strained while cooking; and it consists in the several details of construction, substantially as shown in the drawings and hereinafter described and claimed.

In the accompanying drawings, A represents a perforated sheet-metal cover, provided with a depending rim, $a$, to which the cover is suitably connected, said rim fitting in the top of the boiler B. The boiler may be round or any other desirable form or shape, and the cover to correspond, the boiler having around its edge a flange, $b$, over which catch the hooked ends $c$ of a locking-bar, C, to hold the cover in place over the boiler. The cover A is formed with a segmental spout, D, and under it is placed a sieve, E, provided with a straining-cloth, F, placed over it, as shown, and resting on the upper edge of the sieve-frame $d$. As the saccharine juice, with the scum, boils, it passes up through the spout D and is discharged on the cloth F, which retains the scum, while the juice passes through the sieve and back into the boiler B in a cleansed state.

If preferred, the rim $a$ can be made with two bevels to fit on top of and inside of the inclined planes formed by the flange or rim of the boiler; or any suitably-formed flange or rim to the cover may be substituted for that shown.

Having now fully described my invention, what I claim as new, and desire to secure by Letters Patent, is—

A self cooling and straining attachment to sugar and sirup boilers, consisting of a perforated sheet-metal cover having a suitable rim and a segmental spout or goose-neck, and a sieve having a frame and a straining-cloth placed over the frame to receive the juice and scum from the spout, substantially as and for the purpose set forth.

In testimony that I claim the above I have hereunto subscribed my name in the presence of two witnesses.

THOMAS WASHINGTON LANIER.

Witnesses:
   C. H. GRUVES,
   DENIS RILEY.